2,897,219

Δ⁵-20-KETO-3:16:21-TRIHYDROXY-PREGNENES AND ESTERS THEREOF

Albert Wettstein, Basel, Charles Meystre, Arlesheim, and Walter Voser, Basel, Switzerland, assignors to Ciba Pharmaceutical Products, Inc., Summit, N.J.

No Drawing. Application June 3, 1954
Serial No. 434,336

Claims priority, application Switzerland June 12, 1953

3 Claims. (Cl. 260—397.47)

This invention relates to novel compounds of the pregnane series and a process for preparing them.

It is known to prepare compounds of the suprarenal cortex hormone series by the introduction of an acyloxy group into the 21-position of 20-keto-pregnanes by means of metal acylates or aryliodoso acylates (see for eample British Patents Nos. 502,474, 524,006 and 536,210 and French Patent No. 898,140).

The present invention is concerned with the manufacture of 20-keto-compounds of the pregnane series which contain in each of the 3- and 16-positions a free or functionally converted hydroxyl or oxo group, in 21-position a free or substituted hydroxyl group, e.g., an acyloxy group, for instance a lower alkanoyloxy group, and preferably a double bond extending from the 5-carbon atom to one of the carbon atoms 4 and 6. These 20-keto-pregnanes are of especial value because they either exhibit the activity of suprarenal cortex hormones and are useful for adrenal cortical insufficiency, or as intermediates which can be converted into such hormones by known methods.

The novel compounds are obtained by reacting with metal acylates such compounds of the pregnane series as contain in 3- and in 16-position a free or functionally converted hydroxyl or oxo group, in 20-position an oxo group and in 21-position at least one hydrogen atom, and optionally converting any functionally converted hydroxyl or oxo groups to free hydroxy and oxo groups.

As starting materials compounds of the pregnane series are used, among which are to be understood not only the actual pregnane derivatives but also any compounds which are stereoisomeric, for example in 5-, 14- or 17-position, racemates, such as are obtained by total synthesis and homologous compounds, as for example 4-methyl, 4:4-dimethyl-, 14-methyl-, 17-methyl- and 21-methyl-derivatives and also 19-nor, 18:19-bisnor-, C-nor- and D-homo-compounds. They may be saturated or unsaturated for example in 1-, 4-, 5-, 9:11-, 11- and/or 14-position. They contain as substituents, in addition to the 20-oxo group, a free hydroxyl group or a functionally converted hydroxyl or oxo group in both 3- and 16-position.

Examples of functionally converted hydroxyl groups are especially alkoxy groups, such as methoxy or propyloxy groups, aryloxy groups, such as phenyloxy or tolyloxy groups, aralkoxy groups, such as benzyloxy, p-methylbenzyloxy, diphenyl-methoxy or triphenylmethoxy groups, ether groups with heterocyclic residues, such as the dihydropyranyl residue and ester groups with the residues of acetic acid, trimethyl acetic acid, propionic acid, 4-methyl-5-acyloxy valeric acids, benzoic acid, benzyl carbonic acid, diphenylmethyl carbonic acid, methane sulfonic acid or p-toluene sulfonic acid. As examples of functionally converted oxo groups there may be especially mentioned ketals including cyclic compounds, which are derived, for example, from ethylene, propylene or butylene glycols, enol derivatives, such as enol ethers, enol esters and enamines, for example of pyrrolidine, and also hydrazones, for example semi-carbazones. Enol derivatives of α:β-unsaturated ketones, such as Δ⁴-3-ketones, are less suitable, on account of the sensitive conjugated double bond system, for reaction with metal acylates. In addition to the substituents in the specified positions, the starting materials can also contain further substituents, especially free or substituted hydroxyl or oxo groups, epoxy groups or halogen atoms, for example in 2-, 4-, 5-, 6-, 7-, 11-, 12-, 14-, 15-, 17- and 19-position. Especially to the 21-carbon atom to which at least one hydrogen atom is attached, there can also be attached in addition thereto, for example, a carboxyl, carbalkoxy or oxalyl group.

As metal acylates for the reaction there are particularly suitable lead tetraacylates, such as lead tetraacetate, propionate, butyrates, valerates, trimethyl-acetate, undecylenate, benzoate, cyclopentyl-propionate or phenyl-propionate. As solvents are used especially the acids corresponding to the acyl residues, such as acetic acid, propionic acid or valeric acid, often with an addition of the corresponding acid anhydrides, such as acetic anhydride or butyric acid anhydride, and if desired also a further inert solvent or diluent, such as hexane, heptane, benzene or toluene. In general temperatures are used in the neighborhood of 70° C. In the presence of sensitive substituents, such as a free or acylated 16-hydroxyl group, and in order to avoid any reaction which may sometimes tend to take place to some extent in 17-position, the process can also be carried out at considerably lower temperatures, for example at room temperature, if desired in the presence of small quantities of catalysts, such as acids or boron trifluoride.

As stated above, functionally converted hydroxyl or oxo groups in the 21-acyloxy compounds of the pregnane series which are obtained, can be liberated or split off. For this purpose the agents and conditions known per se can be used which are suitable according to the nature of the substitution. Thus, for example, alkoxy, aralkoxy, acyloxy, ketal, enol ether and enol ester groups may be split off by means of acid or alkaline hydrolyzing or transesterifying agents. The relatively energetic reaction condition for the splitting off of the alkoxy and aralkoxy substituents render their use in this case of less advantage, on the other hand acyloxy groups and also the other specified substituents can be hydrolyzed by the gentle action of alkaline, acid or trans-esterifying agents, for example by bicarbonate solution or dilute mineral acids. 16-acyloxy groups, and also the free substituents in this position can also be easily split off in this operation with the formation of a double bond. Aralkoxy groups and corresponding carbonic acid esters can in most cases be split off merely by careful hydrogenation, for example by means of palladium-calcium carbonate catalyst. They are therefore applied with advantage, for example in 16-position, if the splitting off of the substituent, which takes place especially easily in this position with formation of a double bond, is required to be avoided. Enamines can in general be split up merely by heating in an inert solvent, which limits their application in acylation in 21-position. Hydrazones are advantageously split up with acid agents in the presence of carbonyl compounds such as pyroracemic acid.

In the hydrolytic methods of splitting up mentioned above, in general also the 21-hydroxyl group and any hydroxyl or oxo group in 16-position are also liberated. Especially the former, or also, for example, a 16-hydroxyl group, can subsequently be esterified or etherified, if desired partially.

For this purpose the customary reagents are used, for example acid chlorides or anhydrides or isopropenyl acylates, if desired only in approximately equivalent amounts and under very mild reaction conditions. In this manner, for example, the residues of acetic acid, trimethyl acetic acid, propionic acid, valeric acids, oenanthic acid, undecylenic acid, benzoic acid, phenyl propionic acid, cyclopentyl propionic acid, of polycarboxylic acids, hydroxy-carboxylic acids, polyoxymethylene carboxylic acids or of inorganic acids can be introduced. In the case of ethers, especially those with carbohydrates, such as ribose, glucose, galactose, saccharose, maltose or lactose can be prepared.

In products obtained which contain a free 3-hydroxyl group, the latter can be converted into an oxo group in the conventional manner by the action of dehydrogenating agents. For this purpose there can be used, for example, chromic acid in glacial acetic acid, chromium salts in an acid medium, chromium trioxide-pyridine complex, permanganates, metal alcoholates or phenolates in ketones, N-bromacetamide, for example in dioxane-water or pyridine-tert.-butanol, hypohalides, heating with metals or metal oxides such as copper oxide and so on. An isolated double bond (for example in 5:6-position) can be intermediately protected by attachment of halogen or hydrogen halide or by conversion into an i-steroid. If an $\alpha$:$\beta$-double bond is present (for example in 4:5-position), manganese dioxide is also suitable for the oxidation. If in addition to the 3-hydroxyl group other free hydroxyl groups are present, for example in 11-, 12- or 16-position, these latter can either be simultaneously dehydrogenated or, by selection of suitable dehydrogenating agents, milder reaction conditions, calculated quantities of the reagents and shorter reaction periods, the reaction can also to some extent be carried out with retention of hydroxyl groups.

Finally, in reaction products with a free 3-oxo group, a double bond can be introduced in $\alpha$-position thereto in the known manner. Such a process advantageously includes bromination, reaction with a hydrazine, such as semi-carbazide and splitting of the hydrazone by means of a carbonyl compound such as pyroracemic acid.

The invention also includes any process in which there is used as starting material a compound obtainable as intermediate product at any stage of the complete process, the remaining stages of the process being then carried out.

The following examples illustrate the invention, the relation between parts by weight and parts by volume being the same as that between the gram and the cubic centimeter:

*Example 1*

10 parts by weight of $\Delta^5$-16-methoxy-pregnene-3$\beta$-ol-20-one are dissolved in 300 parts by volume of glacial acetic acid and the solution diluted with 200 parts by volume of benzene. The resulting solution is treated with 13 parts by weight of lead tetra-acetate, gently heated until the lead tetra-acetate is consumed and poured into ice water. The suspension is extracted with an ether-chloroform mixture (4:1). The ether-chloroform solution is washed with dilute, ice cold bicarbonate solution and water, dried and evaporated under vacuum. The residue is chromatographed on 300 parts by weight of aluminum oxide with elution with benzene-pentane mixtures and then with benzene and with benzene-ether mixtures. The benzene-pentane eluates contain some $\Delta^5$-3$\beta$:21-diacetoxy-16-methoxy-pregnene-20-one, whereas on evaporation of the benzene- and benzene-ether eluates $\Delta^5$-21-acetoxy-16-methoxy-pregnene-3$\beta$-ol-20-one is obtained.

1 part by weight of the latter compound is dissolved in 20 parts by volume of toluene. The solution is treated with 9 parts by volume of cyclohexanone and 5 parts by volume of the mixture are distilled off again in a current of nitrogen. With continuous distilling off, there is introduced dropwise into the boiling solution, within 25 minutes, a solution of 0.3 part by weight of aluminum isopropylate in 5 parts by volume of toluene. After further distillation for 15 minutes, the cooled reaction mixture is treated with an aqueous Rochelle salt solution and evaporated under vacuum. The suspension obtained is extracted with ethyl acetate and the extract washed with water, dried and evaporated. The residue is chromatographed on 30 parts by weight of aluminum oxide. The hexane-benzene and benzene eluates yield: $\Delta^4$-21-acetoxy-16-methoxy-pregnene-3-20-dione.

For hydrolysis, 1 part by weight of the above described crude $\Delta^5$-3$\beta$:21-diacetoxy-16-methoxy-pregnene-20-one is dissolved in a dioxane-water mixture and the solution treated with 1 part by weight of potassium carbonate dissolved in a little water and the whole allowed to stand for 24 hours at 20° C. in a nitrogen atmosphere. After the addition of water, the reaction mixture is extracted with ethyl acetate and the ethyl acetate solution washed with water, dried and evaporated. The residue contains the oily $\Delta^5$-3$\beta$:21-dihydroxy-16-methoxy-pregnene-20-one, which can be partially acetylated in 21-position in the following manner:

1 part by weight of the crude $\Delta^5$-3$\beta$:21-dihydroxy-16-methoxy-pregnene-20-one is dissolved in 5 parts by volume of dry pyridine. The solution is treated with 0.3 part by volume of acetic anhydride, left to stand for 20 hours at 20° C. and, after the addition of water, evaporated under vacuum. The residue is chromatographed on aluminum oxide as described above. The benzene and benzene-ether eluates yield $\Delta^5$-21-acetoxy-16-methoxy-pregnene-3$\beta$-ol-20-one.

*Example 2*

10 parts by weight of $\Delta^5$-16-diphenylmethoxy-pregnene-3$\beta$-ol-20-one are dissolved in 500 parts by volume of glacial acetic acid, whereupon 9 parts by weight of lead tetra-acetate and a catalytic quantity of gaseous hydrogen chloride are added. After 21 hours standing at room temperature, the whole is poured into ice water and the suspension extracted with an ether-chloroform mixture (4:1). The organic solution is washed with dilute ice cold sodium carbonate solution and water, dried and evaporated under vacuum. The residue is chromatographed on 300 parts by weight of aluminum oxide. The pentane and benzene-pentane eluates are rejected. From the benzene and benzene-ether eluates there is obtained as main product $\Delta^5$-16-diphenylmethoxy-21-acetoxy-pregnene-3$\beta$-ol-20-one.

To 1 part by weight of the crude 21-monoacetate in 10 parts by volume of pyridine there is added a solution of 1.5 parts by weight of chromium trioxide in 2 parts by volume of water and 5 parts by volume of pyridine and the whole is allowed to stand for 24 hours at 20° C. After the addition of water the oxidation mixture is extracted with ethyl acetate. The ethyl acetate solution is washed with ice cold potassium bicarbonate solution and water and dried. It contains the crude $\Delta^4$-16-diphenylmethoxy-21-acetoxy-pregnene-3:20-dione which, without further purification, is hydrogenated in 20 parts by volume of ethyl acetate. After the addition of 0.1 part by weight of palladium-calcium carbonate catalyst the mixture is shaken at 20° C. with hydrogen until 1 mol has been taken up. The catalyst is then filtered off with suction and the solution carefully evaporated under vacuum. The light yellow residue contains $\Delta^4$-21-acetoxy-pregnene-16-ol-3:20-dione which is recrystallized from aqueous acetone.

The crude $\Delta^4$-16-diphenylmethoxy-21-acetoxy-pregnene-3:20-dione can also be further worked up as follows:

1 part by weight of this compound is dissolved in 20 parts by volume of dry benzene. The solution is treated with 1 part by volume of glycol and 0.1 part by weight of p-toluene sulfonic acid and slowly distilled with continuous dropwise addition of dry benzene. After 1 hour the cooled solution is washed with water, dried and evaporated under vacuum. The $\Delta^5$-16-diphenylmethoxy-21-acetoxy-pregnene-3:20-dione-3-monoketal which results is dissolved in 20 parts by volume of ethyl acetate. The solution is treated with 0.1 part by weight of palladium-calcium carbonate catalyst and hydrogenated at 20°

C. until 1 mol of hydrogen has been taken up. The catalyst is then filtered with suction and the solution evaporated under vacuum. The residue contains $\Delta^5$-21-acetoxy-pregnene-16-ol-3:20-dione-3-monoketal. It is dissolved in 20 parts by volume of acetone and the solution treated with 0.1 part by weight of p-toluene sulfonic acid and allowed to stand for 24 hours at 20° C. The acetone is then evaporated off under vacuum and the residue taken up in ethyl acetate and the ethyl acetate solution washed with water, dried and evaporated. In this manner $\Delta^4$-21-acetoxy-pregnene-16-ol-3:20-dione is likewise obtained.

*Example 3*

10 parts by weight of $\Delta^5$-3$\beta$-acetoxy-16-[4'-methyl-5'-acetoxy-valeryloxy-pregnene-20-one (obtained by treatment of diosgenin acetate with acetic anhydride at about 180–190° C. under pressure for several hours) are dissolved in 500 parts by volume of glacial acetic acid. The solution is treated with 9.1 parts by weight of lead tetra-acetate, heated gently until the lead tetra-acetate is consumed and poured into ice water. The suspension is taken up in ethyl acetate and the solution washed with dilute ice cold bicarbonate and water, dried and evaporated under vacuum. The oil obtained is chromatographed on 300 parts by weight of aluminum oxide. The benzene-pentane eluates contain $\Delta^5$-3$\beta$:21-diacetoxy-16-[4'-methyl-5'-acetoxy-valeryloxy]-pregnene-20-one. Subsequent benzene and benzene-ether eluates are evaporated together. The residue contains $\Delta^5$-16-[4'-methyl-5'-acetoxy-valeryloxy]-21-acetoxy-pregnene-3$\beta$-ol-20-one.

1 part by weight of the latter compound is dissolved in 10 parts by volume by pyridine and the solution treated with 1.5 parts by weight of chromium trioxide, dissolved in 2 parts by volume of water and 5 parts by volume of pyridine, and allowed to stand for 24 hours at 20° C. The oxidation mixture is treated with water and taken up in ethyl acetate. The ethyl acetate solution is washed with ice cold dilute hydrochloric acid, water, dilute ice cold potassium bicarbonate solution and water, dried and evaporated. The residue constitutes $\Delta^4$-16-[4'-methyl-5'-acetoxy-valeryloxy]-21-acetoxy-pregnene-3:20-dione. This compound is dissolved in a mixture of dioxane and water and the solution treated with 0.75 part by weight of potassium bicarbonate in a little water and allowed to stand for 48 hours at a low temperature. The solution is now poured into a large quantity of water and the resulting product extracted by shaking with ethyl acetate. The ethyl acetate solution is washed with water, dried and evaporated under vacuum. In this manner, $\Delta^4$-16:21-dihydroxy-pregnene-3:20-dione is obtained.

*Example 4*

0.1 part by weight of $\Delta^5$-3$\beta$:16$\beta$-diacetoxy-pregnene-17$\alpha$-ol-20-one is dissolved in 5 parts by volume of glacial acetic acid. The solution is treated with 0.13 part by weight of lead tetra-acetate and heated in a nitrogen atmosphere. For isolation of the reaction product the reaction mixture is poured into water and extracted with an ether-chloroform mixture (4:1) and the organic solution washed with dilute ice cold sodium bicarbonate solution and water and evaporated to dryness. The residue is chromatographed on 5 parts by weight of aluminum oxide. From the benzene-ether eluates there is obtained $\Delta^5$-3$\beta$:16$\beta$:21-triacetoxy-pregnene-17$\alpha$-ol-20-one, which after recrystallization from ether melts at 181–183° C.; $[\alpha]_D^{26}=-24°$ (in chloroform).

The $\Delta^5$-3$\beta$:16$\beta$-diacetoxy-pregnene-17$\alpha$-ol-20-one used as starting material can be prepared with advantage as follows:

0.5 part by weight of $\Delta^5$-3$\beta$-acetoxy-16:17$\alpha$-oxido-pregnene-20-one is dissolved in 10 parts by volume of glacial acetic acid and after the addition of 1 part by volume of a mixture of 10 parts by volume of glacial acetic acid and 25 parts by volume of concentrated sulfuric acid, the mixture is allowed to stand for 6 hours at room temperature. The green colored solution is introduced into a separating funnel with 100 parts by volume of ice water and 150 parts by volume of benzene and the aqueous layer separated and extracted again with benzene. The combined benzene solutions are washed with water, sodium bicarbonate solution and water, dried and evaporated. From the crude product resulting (0.53 part by weight) there is obtained by crystallization from methanol or benzene-hexane 0.31 part by weight of $\Delta^5$-3$\beta$:16$\beta$-diacetoxy-pregnene-17$\alpha$-ol-20-one of melting point 169–171° C.; $[\alpha]_D^{26}=38°$ (in chloroform).

The same compound is also obtained from the free $\Delta^5$-16:17$\alpha$-oxide-pregnene-3$\beta$-ol-20-one by treatment for 9 hours with glacial acetic acid-sulfuric acid in the above-described manner, acetylation of the hydroxyl group in 3-position taking place at the same time as the rupture of the epoxide ring.

The hydrolysis of the acetoxy groups can be carried out, for example, as follows:

0.2 part by weight of $\Delta^5$-3$\beta$:16$\beta$-diacetoxy-pregnene-17$\alpha$-ol-20-one is dissolved in 8 parts by volume of dioxane and treated with 0.07 part by weight of potassium hydroxide in 2 parts by volume of water. After standing for 17 hours at room temperature, the clear colorless solution is poured into 80 parts by volume of water. In this way 0.12 part by weight of a crystalline trihydroxy-compound is deposited. The pure substance, after recrystallization from acetone or ethanol, melts at 235–237° C.; $[\alpha]_D^{24}=-63°$ (in chloroform).

*Example 5*

To a solution of 1 part by weight of $\Delta^4$-16$\beta$-acetoxy-pregnene-17$\alpha$-ol-3:20-dione in 50 parts by volume of glacial acetic acid, 0.9 part by weight of lead tetra-acetate is added and the mixture is gently heated until the lead tetra-acetate is consumed and then poured into ice water. The suspension is taken up in ethyl acetate and the solution washed with dilute ice cold sodium bicarbonate solution and water, dried and evaporated under vacuum. By chromatography over aluminum oxide the $\Delta^4$-16$\beta$:21-diacetoxy-pregnene-17$\alpha$-ol-3:20-dione is obtained of melting point 167–168° C. ($\alpha_D=+99°$ in chloroform).

For hydrolysis of the acetate groups, 0.26 part by weight of this compound is dissolved in 0.6 part by volume of methanol and a sodium methylate solution from 0.03 part by weight of sodium and 2.2 parts by volume of methanol is added. After 3 minutes 1 part by volume of a mixture of equal parts by volume of water and methanol is added and after a further three minutes the whole is acidified with 0.1 part by volume of glacial acetic acid. The reaction mixture is then concentrated under vacuum, treated with 20 parts by volume of water and extracted with chloroform. From the chloroform extract after washing with water, sodium carbonate solution and water and drying, there is obtained after evaporation of the solvent, on addition of acetone, 0.18 part by weight of a crystallizate. By recrystallization from acetone and isopropyl ether, a trihydroxy-compound is obtained of melting point 225–227° C. ($\alpha_D=+101°$ in chloroform-ethanol).

The starting material used above may be prepared as follows:

3 parts by weight of $\Delta^4$-16:17$\alpha$-oxido-pregnene-3:20-dione are dissolved in 60 parts by volume of glacial acetic acid and treated with 6 parts by volume of a mixture of 10 parts by volume of glacial acetic acid and 2.5 parts by volume of concentrated sulfuric acid. After 8 hours, the solution, which has a strong red fluorescence, is poured into 350 parts by volume of ice water, extracted with benzene and the benzene extracts washed with water, sodium bicarbonate solution and water, dried and evaporated. From the oily yellow residue there are obtained by crystallization from a mixture of benzene and hexane 1.83 parts by weight of crude $\Delta^4$-16$\beta$-acetoxy-pregnene-17$\alpha$-ol-3:20-dione. After recrystallization from benzene-hexane and from acetone, the pure compound is obtained of melting point 183–184° C. $[\alpha]_D^{27}=+101°$ (in chloroform), which exhibits in the ultra-violet spectrum a strong absorption maximum at 242 m$\mu$ ($\epsilon$=16,600).

For hydrolysis of the acetoxy group, 0.5 part by weight of this compound is dissolved in 15 parts by volume of methanol, treated with a solution of 0.15 part by weight of potassium carbonate in 5 parts by volume of water and the whole allowed to stand for 25 hours at room temperature. After acidification with 0.2 part by volume of glacial acetic acid, the reaction mixture is concentrated to 5–7 parts by volume, treated with 70 parts by volume of water and the precipitate filtered with suction. The resulting crude product is taken up in the moist condition in chloroform, washed with N-sodium carbonate solution and water and dried and evaporated. From the 0.41 part by weight of solid crude product obtained there is produced by recrystallization from a mixture of hexane and acetone a pure dihydroxy compound of melting point 217–219° C.; $[\alpha]_D^{24}=+92°$ (in chloroform). The compound exhibits in the ultra-violet spectrum a strong absorption maximum at 239 m$\mu$ ($\epsilon$=16,150).

*Example 6*

To a solution of 10 parts by weight of $\Delta^5$-3$\beta$-formyloxy-16$\alpha$-acetoxy-20-keto-pregnene in 500 parts by volume of a 4:1 mixture of glacial acetic acid and acetic anhydride are added 13 parts by weight of lead tetra-acetate and the whole is gently heated until the lead tetra-acetate is consumed, after which the reaction mass is poured on to ice water. The suspension is extracted by agitation with a 4:1-mixture of ether and chloroform, the ether-chloroform solution then washed with an ice-cold dilute potassium bicarbonate solution and water, dried and evaporated under reduced pressure. The residue is recrystallized from a mixture of ether and pentane to obtain the $\Delta^5$-3$\beta$-formyloxy-16$\alpha$:21-diacetoxy-20-keto-pregnene of melting point 180–182° C. and showing the specific rotation $[\alpha]_D^{20}=-24°$ (in chloroform). This compound rapidly and strongly reduces an alkaline solution of silver diammine.

A solution of 1 part by weight of $\Delta^5$-3$\beta$-formyloxy-16$\alpha$:21-diacetoxy-20-keto-pregnene in 50 parts by volume of dioxane is mixed at 15° C. with a solution of 0.5 part by weight of potassium bicarbonate in 5 parts by volume of water and allowed to stand for 10 minutes. The solution is then neutralized with dilute acetic acid and evaporated to a considerable extent under reduced pressure. The residue is dissolved in ethyl acetate, the ethyl acetate solution washed with dilute potassium bicarbonate solution and water, dried and evaporated. By recrystallization the residue from ether or mixture of ether and pentane, there is obtained the pure $\Delta^5$-3$\beta$-hydroxy-16$\alpha$:21-diacetoxy-20-keto-pregnene of melting point 157–159.5° C.

For the protection of the 5:6-double bond, 1 part by weight of the $\Delta^5$-3$\beta$-hydroxy-16$\alpha$:21-diacetoxy-20-keto-pregnene is dissolved in 20 parts by volume of carbon tetrachloride and the solution is mixed slowly with a solution of 0.4 part by weight of bromine in 5 parts by volume of carbon tetrachloride. The excess of bromine is then eliminated under reduced pressure. To the solution of the dibromide there is then added at 20° C. a solution of 0.18 part by weight of chromium trioxide in 95 parts by volume of glacial acetic acid and 5 parts by volume of water, and the whole is allowed to stand at 20° C. for 10 hours. The excess of chromic acid is decomposed with some sodium bisulfate solution, and the reaction mass is then concentrated under reduced pressure. The resulting suspension is extracted with ethyl acetate.

While cooling with ice, the ethyl acetate solution is washed with dilute hydrochloric acid, dilute potassium bicarbonate solution, and water, then dried and evaporated. The residue is dissolved in 40 parts by volume of acetone and the solution mixed with a solution of chromous chloride (prepared from 9 parts by weight of chromic chloride) and allowed to stand at 20° C. for 20 minutes. The reaction solution is treated with water, the acetone evaporated under reduced pressure the residue taken up in ether, the ethereal solution washed with water, dried and evaporated. The crude product so obtained is chromatographed over 30 parts by weight of alkali-free alumina. The fractions obtained with benzene and ether are combined and evaporated under reduced pressure. The residue is crystallized from mixtures of acetone and petroleum ether to obtain the $\Delta^4$-3:20-diketo-16$\alpha$:21-diacetoxy-pregnene of melting point 150.5–153° C.;

$$[\alpha]_D^{23}= +113°$$

(in ethanol). This compound rapidly and strongly reduces a solution of silver diammine and shows at 240 m$\mu$ ($\epsilon$ max.=16,400 in alcohol) a strong U.V. absorption.

The two acetoxy groups can be hydrolyzed as follows:
An enriched active cholinesterase fraction is mixed with 100 parts by volume of a sterile, dilute aqueous sodium acetate solution. While stirring well at 30–37° C. there is added a solution of 1 part by weight of $\Delta^4$-3:20-diketo-16$\alpha$:21-diacetoxy-pregnene in a little acetone and some toluene. The resulting suspension is stirred for 2–3 days at the same temperature, then extracted with ethyl acetate, the extract washed with dilute hydrochloric acid, dilute potassium bicarbonate solution and water, dried and evaporated under reduced pressure. The residue is chromatographed over 30 parts by weight of silica gel and from the evaporated ether-ethyl acetate and glacial acetic acid eluates there is obtained after recrystallization from acetone and methanol the $\Delta^4$-3:20-diketo-16$\alpha$:21-dihydroxy-pregnene in the form of needles which melt at 203–205° C.; $[\alpha]_D^{24}=+114.5°$ (in ethanol); max. 241 m$\mu$, $\epsilon$=16,300 (in ethanol).

For mono-acetylation, 1 part by weight of $\Delta^4$-3:20-diketo-16$\alpha$:21-dihydroxy-pregnene is dissolved in acetone, mixed with benzene and evaporated under reduced pressure. The dry compound is dissolved in 15 parts by volume of dry pyridine, 3.9 parts by volume of a 10 percent solution of acetic anhydride in dry benzene are added and the whole is allowed to stand at 20° C. for 20 hours. The reaction solution is then treated with some water and evaporated under reduced pressure at 35° C. The residue is taken up in a mixture of ether and chloroform (4:1), the solution washed in the cold with dilute hydrochloric acid, dilute sodium bicarbonate solution and water, dried and evaporated. For purification, the residue is dissolved in benzene and chromatographed over 30 parts by weight of alkali-free alumnia. From the evaporated ether-ethyl acetate eluates some unchanged $\Delta^4$-3:20-diketo-16$\alpha$:21-dihydroxy-pregnene can be obtained. From the further ethyl acetate eluates the $\Delta^4$-3:20-diketo-16$\alpha$-hydroxy-21-acetoxy-pregnene is isolated. From mixtures of methanol and ether it crystallizes in the form of prisms which melt at 207–209° C.

The $\Delta^5$-3$\beta$-formyloxy-16$\alpha$-acetoxy-20-keto-pregnene can be obtained as follows:

1 part by weight of $\Delta^5$-3$\beta$-formyloxy-16$\alpha$-benzyloxy-20-keto-pregnene is dissolved in 100 parts by volume of alcohol and hydrogenated in the presence of a palladium on charcoal catalyst until 1 mol of hydrogen has been absorbed. After removal of the catalyst by filtration and evaporation of the solvent in vacuo the crude $\Delta^5$-3$\beta$-formyloxy-16$\alpha$-hydroxy-20-keto-pregnene is dissolved in 5 parts by volume of pyridine and 5 parts by volume of acetic anhydride and the solution is allowed to stand at room temperature for 20 hours. The reaction mixture is then poured into water, extracted with ether and the organic solution is washed with dilute hydrochloric acid, sodium carbonate solution and water. After evaporation of the ether the Δ⁵-3β-formyloxy-16α-acetoxy-20-keto-pregnene is obtained which after recrystallization, melts at 195–197° C.; $[\alpha]_D = -44°$ (in chloroform).

What is claimed is:

1. A process which comprises treating a Δ⁵-3:16α-diacyloxy-20-keto-pregnane wherein the acyl radicals are derived from a member of the group consisting of formic acid and a lower alkyl carboxylic acid in the 3-position and a lower alkyl carboxylic acid in the 16-position, with lead tetracetate to produce the corresponding 21-acetoxy-pregnene.

2. A process which comprises treating a Δ⁵-3:16β-diacyloxy-17α-hydroxy-20-keto-pregnene wherein the acyl radicals are derived from a member of the group consisting of formic acid and a lower alkyl carboxylic acid in the 3-position and a lower alkyl carboxylic acid in the 16-position, with lead tetracetate to produce the corresponding 21-acetoxy-pregnene.

3. A compound of the formula:

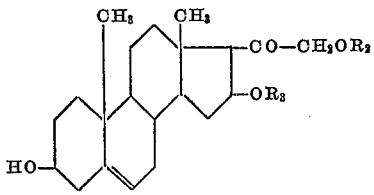

in which $R_2$ and $R_3$ stand for lower alkyl carbonyl groups.

References Cited in the file of this patent

UNITED STATES PATENTS

| | | |
|---|---|---|
| 2,230,772 | Bockmuhl | Feb. 4, 1941 |
| 2,230,773 | Bockmuhl | Feb. 4, 1941 |
| 2,352,851 | Marker | July 4, 1944 |
| 2,395,338 | Marker | Feb. 19, 1946 |
| 2,666,770 | Wall | Jan. 19, 1954 |
| 2,708,201 | Dodson | May 10, 1955 |
| 2,709,705 | Perlman | May 31, 1955 |

FOREIGN PATENTS

| | | |
|---|---|---|
| 536,210 | Great Britain | May 7, 1941 |

OTHER REFERENCES

Fuknshima: Jour. Am. Chem. Soc. 73, 196–201 (1951).

UNITED STATES PATENT OFFICE
CERTIFICATE OF CORRECTION

Patent No. 2,897,219                             July 28, 1959

Albert Wettstein et al

It is hereby certified that error appears in the printed specification of the above numbered patent requiring correction and that the said Letters Patent should read as corrected below.

Column 1, line 20, for "eample" read -- example --; column 7, line 73, for "sodium bisulfate solution" read -- sodium bisulfite solution --; column 8, line 55, for "alumnia" read -- alumina --.

Signed and sealed this 22nd day of March 1960.

(SEAL)
Attest:

KARL H. AXLINE                                        ROBERT C. WATSON
Attesting Officer                                      Commissioner of Patents